United States Patent
Kuroiwa et al.

(10) Patent No.: US 6,984,802 B2
(45) Date of Patent: Jan. 10, 2006

(54) LASER BEAM MACHINING DEVICE

(75) Inventors: Tadashi Kuroiwa, Tokyo (JP); Kenichi Ijima, Tokyo (JP); Nobutaka Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/495,781

(22) PCT Filed: Nov. 13, 2002

(86) PCT No.: PCT/JP02/11838

§ 371 (c)(1),
(2), (4) Date: May 17, 2004

(87) PCT Pub. No.: WO03/041904

PCT Pub. Date: May 22, 2003

(65) Prior Publication Data
US 2004/0262275 A1    Dec. 30, 2004

(30) Foreign Application Priority Data
Nov. 15, 2001   (JP)  ............................. 2001-349664

(51) Int. Cl.
*B23K 26/06* (2006.01)

(52) U.S. Cl. ......................... 219/121.73; 219/121.75; 219/121.77

(58) Field of Classification Search ........... 219/121.73, 219/121.74, 121.75, 121.7, 121.71, 121.77, 219/121.83
See application file for complete search history.

(56) References Cited

U.S. PATENT DOCUMENTS

| | | | |
|---|---|---|---|
| 6,424,670 B1 * | 7/2002 | Sukhman et al. | 372/107 |
| 6,521,866 B1 * | 2/2003 | Arai et al. | 219/121.73 |
| 2002/0153361 A1 * | 10/2002 | Sakamoto et al. | 219/121.73 |
| 2004/0104208 A1 * | 6/2004 | Ijima et al. | 219/121.77 |

FOREIGN PATENT DOCUMENTS

| | | |
|---|---|---|
| JP | 9-29467 A | 2/1997 |
| JP | 11-314188 A | 11/1999 |
| JP | 2000-190087 A | 7/2000 |
| JP | 2001-269790 A | 10/2001 |
| WO | WO 00/53365 A1 | 9/2000 |

* cited by examiner

Primary Examiner—Geoffrey S. Evans
(74) Attorney, Agent, or Firm—Sughrue Mion, PLLC (57) ABSTRACT

A laser material processing apparatus for processing a workpiece (22) in such a way as to separate one laser light (26) into two laser beams (26a, 26b) via first polarizer (25), one laser beam being passed via the mirrors (24), the other laser beam being scanned biaxially by a first galvano scanner (29), and conduct two laser beams (26a, 26b) to a second polarizer (27) for scanning via a second galvano scanner (30), wherein an optical path is constituted such that the laser beam (26b) transmitted through the first polarizer (25) is reflected by the second polarizer (27), and the laser beam (26a) reflected by the first polarizer (25) is transmitted through the second polarizer (27).

8 Claims, 8 Drawing Sheets

PRIOR ART

FIG. 9 PRIOR ART

LASER BEAM MACHINING DEVICE

TECHNICAL FIELD

The present invention relates to a laser material processing apparatus mainly intended for drilling the workpiece such as a printed board to improve the productivity.

BACKGROUND ART

Figure 8:
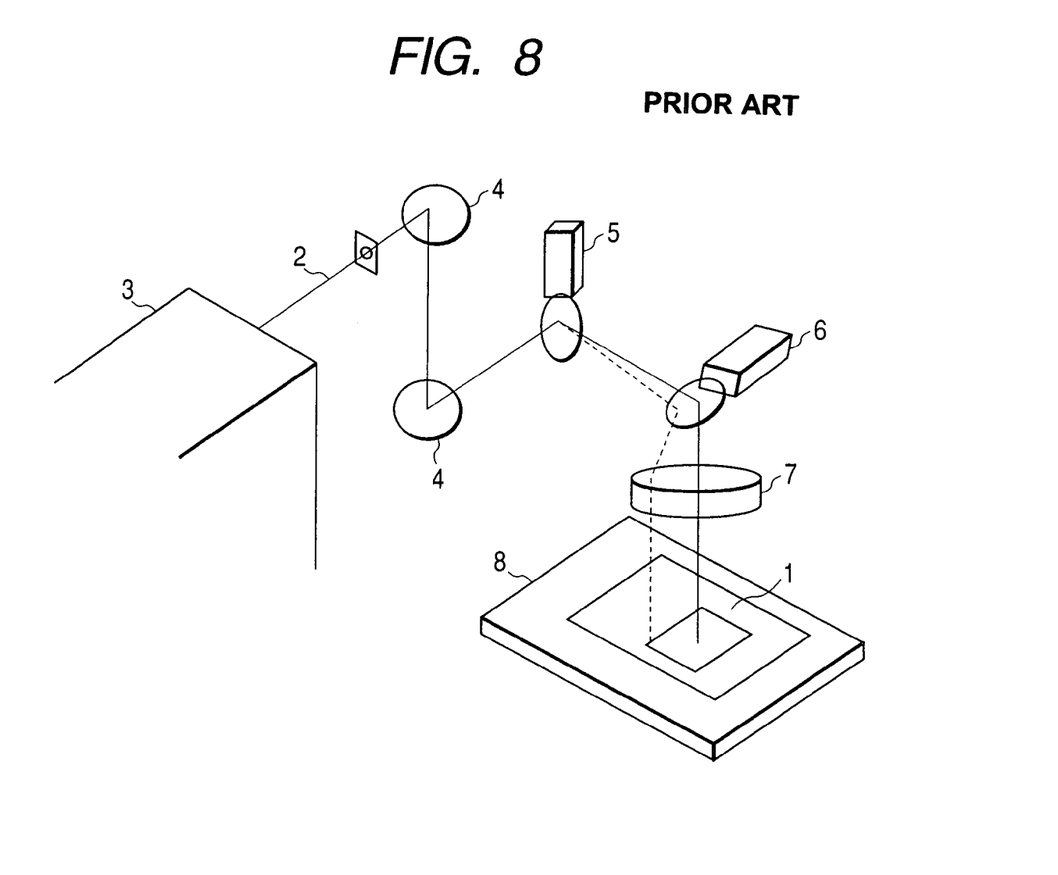
FIG. 8 is a view showing the schematic constitution of the conventional laser material processing apparatus for drilling.

FIG. 8 is a schematic constitutional view showing the conventional laser material processing apparatus for drilling.

In FIG. 8, reference numeral 1 denotes a workpiece such as a printed board, 2 denotes a laser beam for drilling the workpiece 1 to make a via hole or through hole, 3 denotes a laser oscillator for oscillating the laser beam 2, 4 denotes a plurality of mirrors for reflecting the laser beam 2 along the optical path, 5 and 6 denote a galvano scanner for scanning the laser beam 2, 7 denotes an fθ lens for focusing the laser beam 2 on the workpiece 1, and 8 denotes an XY stage for moving the workpiece 1.

In the typical laser material processing apparatus for drilling, the laser beam 2 oscillated from the laser oscillator 3 is conducted via a necessary mask and the mirrors 4 to the galvano scanners 5, 6 and focused via the fθ lens 7 at a predetermined position of the workpiece 1 by controlling the deflection angle of the galvano scanners 5, 6.

The deflection angle of the galvano scanners 5, 6 via the fθ lens 7 is limited to a range of 50 mm square, for example. Therefore, the laser beam 2 is focused at the predetermined position of the workpiece 1 by controlling the XY stage 8 as well, thereby allowing the workpiece 1 to be machined in a broader range.

Herein, the productivity of the laser material processing apparatus is closely related with the drive speed of the galvano scanners 5, 6 and the processing area of the fθ lens 7.

To improve the drive speed of the galvano scanner, it is effective to change the design of an optical system by reducing the mass of a galvano mirror fixed to the rotation shaft of the galvano scanner and driven by controlling the deflection angle, or varying the distance between the galvano scanners 5, 6 and the fθ lens 7, and to reduce the deflection angle while the processing range is maintained. However, if the mirror diameter of the galvano scanner is made smaller to reduce the mass of the galvano mirror, the laser beam 2 has its peripheral portion intercepted by a mask in passing through the mask, and the diameter once reduced, but the laser beam 2 is broadened in diameter due to diffraction after passing through the mask, and has a larger diameter than the galvano mirror when arriving at the galvano mirror of the galvano scanner 5, 6, causing a part of the laser beam 2 to get out of the galvano mirror, so that an image of the mask is not correctly transferred onto the workpiece 1, whereby the micro hole fabrication is not made.

Also, the deflection angle of the galvano scanners is reduced while the processing range is maintained in such a way as to change the optical design, including changing the positional relation between the fθ lens and the galvano scanners. However, it takes a lot of time to design, and it is required to change the specification of the very expensive fθ lens or the design of the overall optical system, whereby it was difficult to improve the productivity easily and cheaply with a single beam.

A laser material processing apparatus of the previously described type intended to improve the productivity was disclosed in JP-A-11-314188, for example.

Figure 9:
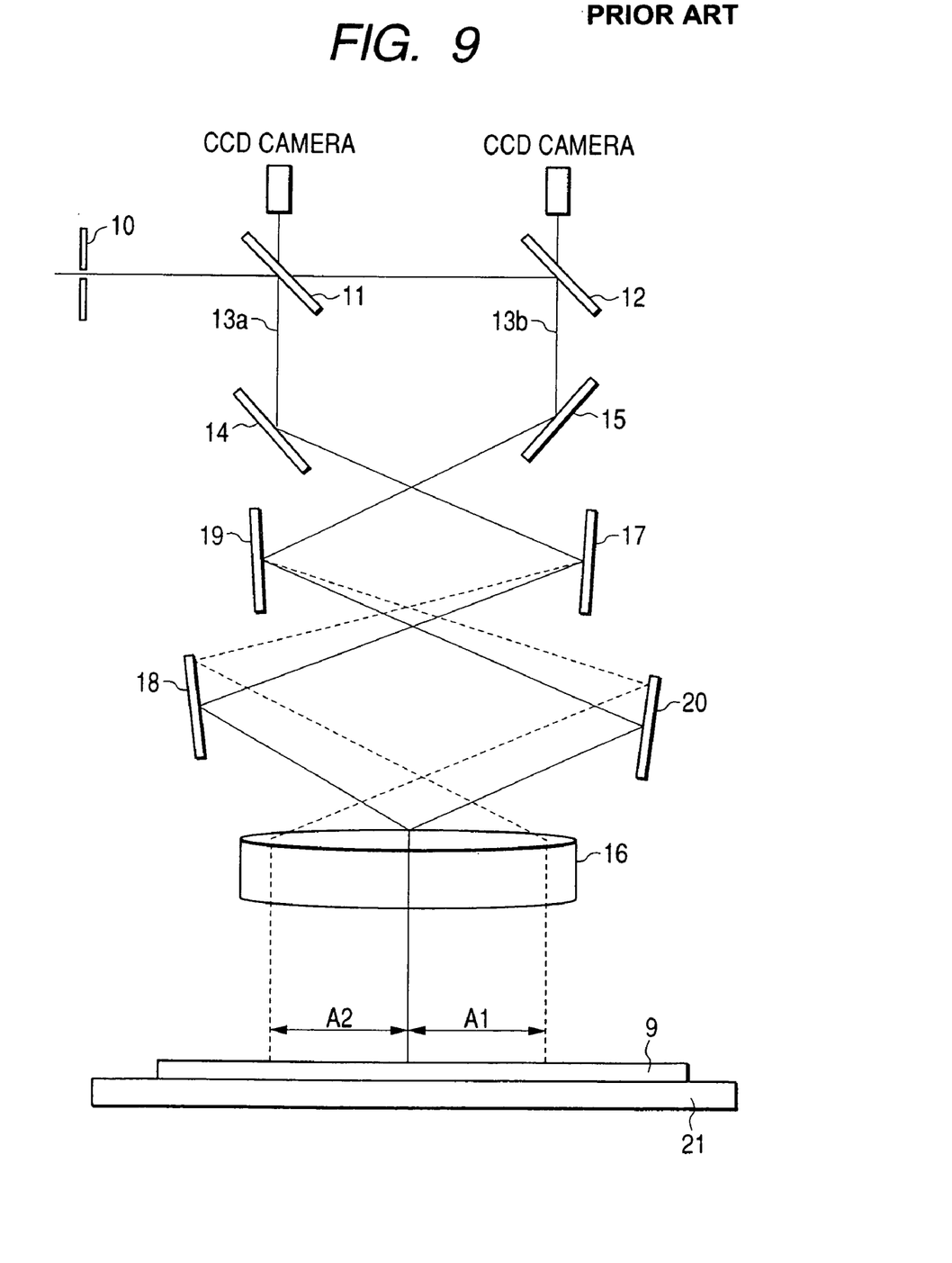
FIG. 9 is a view showing the schematic constitution of the conventional laser material processing apparatus for drilling intended to improve the productivity.

FIG. 9 is a schematic constitutional view of the laser material processing apparatus as disclosed in JP-A-11-314188.

In FIG. 9, reference numeral 9 denotes a workpiece, 10 denotes a mask, 11 denotes a half-mirror for separating a laser light, 12 denotes a dichroic mirror, 13a denotes a laser beam reflected from the half-mirror, 13b denotes a laser beam transmitted through the half-mirror and reflected from the dichroic mirror, 14 and 15 denote the mirrors, 16 denotes an fθ lens for focusing the laser beams 13a and 13b onto the workpiece 9, 17 and 18 denote galvano scanners for conducting the laser beam 13a to a processing area A1, 19 and 20 denote galvano scanners for conducting the laser beam 13b to a processing area A2, and 21 denotes an XY stage for moving each part of the workpiece to the processing area A1 or A2.

The laser material processing apparatus as shown in FIG. 9 separates the laser light passing through the mask 10 via the half-mirror 11 into plural beams, conducts the separated laser beams 13a and 13b to a plurality of galvano scanner systems arranged on the incident side of the fθ lens 16, and scans the laser beams 13a and 13b with the plurality of galvano scanner systems to be applied to the divided processing areas A1 and A2.

The separated laser beam 13a is introduced via the first galvano scanner system 17, 18 into a half area of the fθ lens 16. Also, the other separated laser beam 13b is introduced via the second galvano scanner system 19, 20 into a remaining half area of the fθ lens 16. The first and second galvano scanner systems are arranged in symmetry about the central axis of the fθ lens 16, whereby the half parts of the fθ lens 16 are employed at the same time to improve the productivity.

However, in the apparatus as disclosed in JP-A-11-314188, the first galvano scanner system 17, 18 and the second galvano scanner system 19, 20 scan the laser beams, into which laser light is separated via the half mirror 11, to be applied on the processing areas A1 and A2 that are divided. Therefore, a dispersion in the quality of processed holes is likely to occur due to a difference between reflection from and transmission through the half mirror 11 between the laser beams 13a and 13b, into which laser light is separated by the half mirror 11.

For example, when there is an energy difference between the separated laser beams 13a and 13b, a difference in the hole diameter or hole depth of the processed holes is likely to occur on the workpiece 9. Therefore, there is the possibility that the strict requirements for processing the hole are not satisfied in terms of the dispersion in the hole diameter.

Herein, when the laser beam 13a has a higher energy than the laser beam 13b, it is required to adjust the energy of laser beam 13b to be decreased by further adding an expensive optical component such as an optical attenuator on the optical path of laser beam 13b. The optical component such as the optical attenuator must be produced in the specification of removing the energy at a certain percentage. For example, when the specification of removing the energy of 5% and the specification of removing the energy of 3% are required, two kinds of optical attenuator are produced. Thereby, the optical attenuator is prepared in a few kinds of specification, and exchanged every time the energy difference is adjusted.

Also, in the optical path constitution as shown in FIG. 9, there was a problem that the optical path lengths of laser beams 13*a* and 13*b*, into which laser light is separated after passing through the mask 10, up to the workpiece 9 are different, so that the strict beam spot diameters on the workpiece 9 are different.

Moreover, the fθ lens 16 is equally divided, and the divided processing areas A1, A2 are machined at the same time. Therefore, when the number of processed holes in the processing areas A1 and A2 is greatly varied, or when there is no processed hole of object in either the processing area A1 or A2 such as an end portion of the workpiece, it is not expected to improve the productivity.

DISCLOSURE OF THE INVENTION

This invention has been achieved to solve the above-mentioned problems, and it is an object of the invention to provide a laser material processing apparatus in which a difference in the energy or quality between separated laser beams is minimized to provide an equal optical path length and an equal beam spot diameter for the separated laser beams, and the separated laser beams are applied on the same area to improve the productivity less expensively.

In order to achieve the above object, according to a first aspect of the invention, there is provided a laser material processing apparatus for processing a workpiece in such a way as to separate one laser light into two laser beams via first polarizing means, one laser beam being passed via the mirrors, the other laser beam being scanned biaxially by a first galvano scanner, and conduct two laser beams to second polarizing means for scanning via a second galvano scanner, characterized in that an optical path is constituted such that the laser beam transmitted through the first polarizing means is reflected by the second polarizing means, and the laser beam reflected by the first polarizing means is transmitted through the second polarizing means.

Also, two polarizing means are arranged so that the reflection surfaces may be opposed to each other to form an optical path in which the separated laser beams have the equal optical path length.

Also, a stationary portion of polarizing means is provided with a rotating mechanism around an axis perpendicular to a surface containing the axes of two separated laser beams.

Also, an energy balance of the laser beam is adjusted by changing a transmission factor of the laser beam transmitted through polarizing means by rotation of the rotating mechanism.

The laser beam selecting means is provided for selecting any laser beam from among the separated laser beams.

Also, the laser beam selecting means controls a shutter provided on the optical path of each of the separated laser beams to be opened or closed to take out the laser beam from any optical path.

Also, detection means is provided for detecting an energy balance of laser beam on each optical path, in which the energy balance of each laser beam detected by the detection means is adjusted to be almost equivalent.

Also, the detection means consists of a power sensor provided near an XY table on which the workpiece is laid.

Also, the separated laser beams have the equal optical path length between the first polarizing means and the second polarizing means.

Also, the deflection angle by which the first galvano scanner scans is smaller than the deflection angle by which the second galvano scanner scans.

Also, each laser beam is reflected by the same number of mirrors on each optical path formed between the first polarizing means and the second polarizing means.

Also, third polarizing means is provided between a laser oscillator and the first polarizing means, in which two laser beams separated by the third polarizing means are conducted to the first polarizing means and the second polarizing means and further separated into 2n components.

BEST MODE FOR CARRYING OUT THE INVENTION

Embodiment 1

Figure 1:
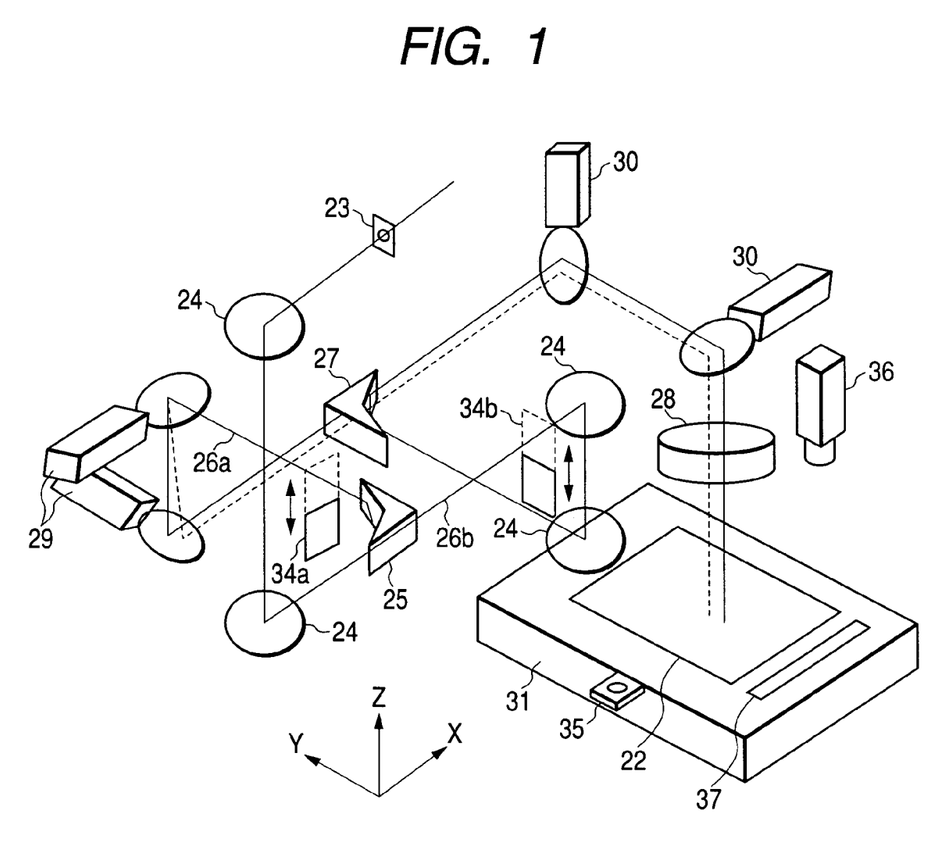
FIG. 1 is a view schematically showing an optical path constitution of a laser material processing apparatus according to an embodiment of the present invention.

FIG. 1 is a schematic constitutional view showing a laser material processing apparatus according to an embodiment of the present invention.

In FIG. 1, reference numeral 22 denotes a workpiece such as a printed board, 23 denotes a mask for forming an image to transfer a desired processing shape (e.g., circle) onto the workpiece 22, 24 denotes a plurality of mirrors for reflecting a laser beam along the optical path, 25 denotes a first polarized beam splitter as first polarizing means for separating a laser light, 26*a* denotes a laser beam reflected from the first polarized beam splitter, 26*b* denotes a laser beam transmitted through the first polarized beam splitter, 27 denotes a second polarized beam splitter as second polarizing means for transmitting the laser beam 26*a* and reflecting the laser beam 26*b*, 28 denotes an fθ lens for focusing the laser beams 26*a* and 26*b* onto the workpiece 22, 29 denotes a first galvano scanner for scanning the laser beam 26*a* biaxially to be conducted to the second beam splitter, 30 denotes a second galvano scanner for scanning the laser beams 26*a* and 26*b* biaxially to be conducted to the workpiece 22, 31 denotes an XY stage for moving the workpiece 22, 34 denotes a shutter as laser beam selecting means provided on the optical path of laser beam and intercepting the laser beam, 35 denotes a power sensor for measuring the energy of laser beam emergent from the fθ lens 28, 36 denotes a CCD camera that is an image pickup device for measuring the hole diameter or position of a processed hole by the laser beam, and 37 denotes a workpiece for correcting the deflection angle of galvano scanner.

Figure 2:
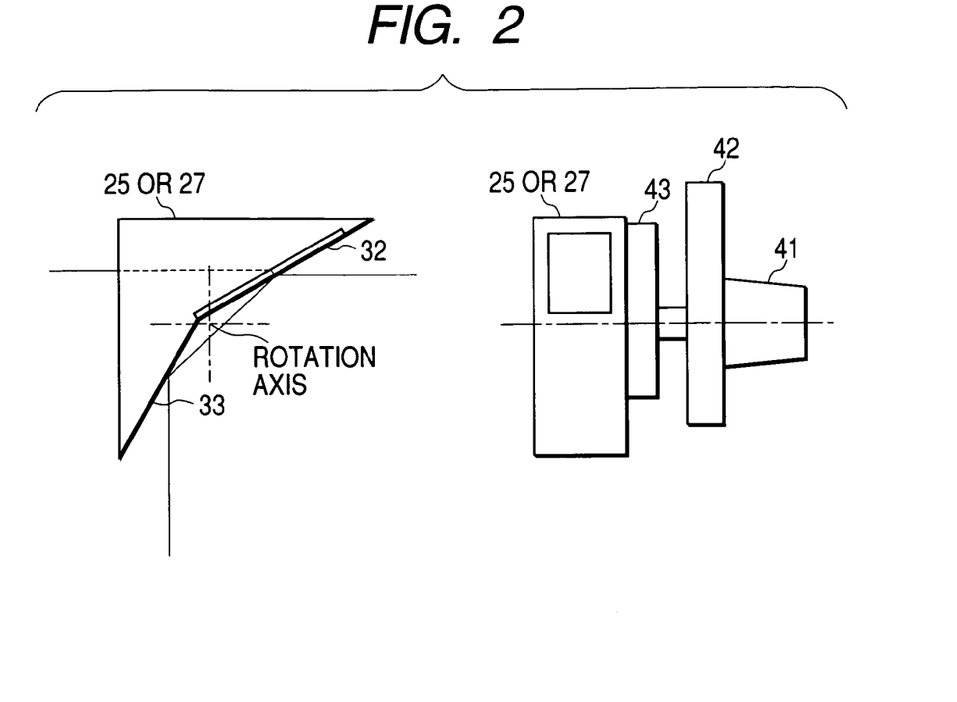
FIG. 2 is an enlarged view and a structural view of a portion for reflecting and transmitting the laser beam in a polarized beam splitter within the optical path constitution of the laser material processing apparatus according to the embodiment of the invention.

FIG. 2 shows a portion for reflecting or transmitting the laser beam in the polarized beam splitter 25 or 27. Reference numeral 32 denotes a window for reflecting or transmitting the incident light, 33 denotes a mirror for causing an incident light component reflected from the window 32 to be reflected at an angle of 90° relative to the incident light, 41 denotes a servo motor having a rotation axis disposed at a position where the emergent angle and position of laser beam are unchanged even if the incident angle of laser beam on the polarized beam splitter is changed, 42 denotes a bracket for securing the servo motor 41, and 43 denotes a bracket for connecting the polarized beam splitter and the servo motor.

For the window portion 32 of the polarized beam splitter 25, 27, a material ZnSe is often employed in a case of $CO_2$ laser, but other materials such as Ge may be employed.

In this invention, the oscillated laser light is circularly polarized and conducted to the first polarized beam splitter 25 for separation into the laser beam 26b that is P wave transmitted through the first polarized beam splitter in a polarization direction parallel to the incident plane and the laser beam 26a that is S wave reflected in a polarization direction perpendicular to the incident plane.

The laser beam conducted to the first polarized beam splitter 25 may be linearly polarized, but not circularly polarized, to make an angle of 45° relative to the polarization directions of P wave and S wave.

Herein, when either the circularly polarized light or the linearly polarized light is conducted to the first polarized beam splitter, it is required to oscillate the laser light of linear polarization from the laser oscillator.

In order to conduct the laser light of circular polarization to the first polarized beam splitter 25, it is required to employ a retarder for changing the linearly polarized light to the circularly polarized light on the optical path, whereby the laser light is incident at an angle of 90° between the incident light and the reflected light in the retarder. Also, the polarization direction of laser light incident on the retarder must make an angle of 45° relative to the line of intersection between a plane made by the optical axis of incidence and the optical axis of reflection as two sides and a reflection surface of the retarder. However, the laser light of circular polarization includes evenly the polarization directions of P wave and S wave, and there is no limitation on the polarization direction when conducting the laser beam to the first polarized beam splitter 25, whereby the optical path is designed with a high degree of freedom.

On the other hand, when the linearly polarized light is employed, it is required to conduct the laser light to the first polarized light beam splitter 25 as the linearly polarized light making an angle of 45° relative to the polarization directions of P wave and S wave separated by the first polarized beam splitter, as previously described. Though there is a limitation on the design of the optical path, it is unnecessary to provide the retarder and an adjusting mechanism for adjusting the polarization direction of laser beam incident on the retarder, and the angle of optical axis, and to make the adjustments, whereby it is possible to simplify the optical path to contribute to reduction of the cost.

The laser beam 26b transmitted through the first polarized beam splitter 25 is conducted via the bend mirrors 24 to the second polarized beam splitter 27. On the other hand, the laser beam 26a reflected from the first beam splitter 25 is caused to scan biaxially by the first galvano scanner 29, and conducted to the second polarized beam splitter 27.

Thereafter, the laser beams 26a, 26b are caused to scan biaxially by the second galvano scanner 30, and applied on the workpiece through the fθ lens 28.

At this time, the laser beam 26a is applied at the same position on the workpiece as the laser beam 26b by scanning of the first galvano scanner 29.

Also, the laser beams can be applied at different two points on the workpiece via the second galvano scanner 30 by causing the laser beam 26a to scan within a preset range for the laser beam 26b, for example, within a range of 4 mm square around the laser beam 26b by scanning of the galvano scanner 29 in view of the characteristics of the window 32 for the beam splitter.

The laser beam 26a reflected from the first polarized beam splitter 25 is transmitted through the second polarized beam splitter 27, and the laser beam 26b transmitted through the first polarized beam splitter is reflected from the second polarized beam splitter 27.

Therefore, two separated laser beams are passed through both the reflection and transmission processes, whereby it is possible to offset a variation in the quality of laser beam or a breakdown in the energy balance.

Figure 3:
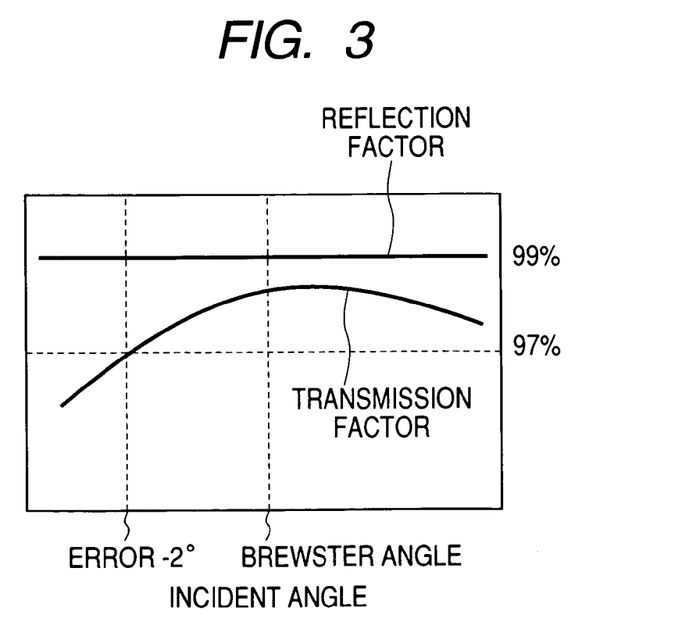
FIG. 3 is a graph showing the dependency of reflection and transmission factors on an incident angle of laser beam in the polarized beam splitter according to the embodiment of the invention.

For example, the reflection and transmission factors in the polarized beam splitter are given near the Brewster angle in which the incident angle of laser beam on the polarized beam splitter is ideal, as shown in FIG. 3.

The longitudinal axis of FIG. 3 is the reflection factor and the transmission factor, which indicate 100% when the incident laser light is fully divided into two beams. For example, when the reflection factor is 100%, the percentage of reflected light to the incident light is 50%.

When the incident angle of laser beam has an error of −2° with respect to the Brewster angle for two polarized beam splitters, the reflection factor of laser beam is 99% and the transmission factor is 97% for each polarized beam splitter. The energies of two laser beams obtained through the reflection or transmission process twice are 98% and 94%, producing an energy difference of 4%, while the energies of laser beams obtained through both the reflection and transmission processes once are both 96%. By making the optical path as previously described, it is possible to offset the characteristics.

Also, two polarized beam splitters may be identical, whereby the offset effect is facilitated to contribute to reduction of the cost.

Two polarized beam splitters are arranged, as shown in FIG. 1, so that the optical path lengths of the laser beams 26a and 26b between the first polarized beam splitter 25 and the second polarized beam splitter 27 are equal. Thereby, the beam spot diameters of two separated laser beams are equalized.

For example, in this embodiment of the invention, when the optical path is decomposed into X, Y and Z directions, the same optical path length is obtained. Therefore, when the design of optical path components is changed dimensionally, the optical path can be extended or contracted in the X, Y and Z directions, whereby the optical path lengths of laser beams 26a and 26b are kept invariant.

Also, the polarized beam splitter is integrated with the mirror 33, so that the reflected light may be emergent at 90° with respect to the incident angle, as shown in FIG. 2.

A stationary portion of the polarized beam splitter has a structure in which a rotating mechanism is provided around the axis perpendicular to the plane containing the axes of two separated laser beams 26a and 26b, as shown in FIG. 2. When there is an energy difference between two separated laser beams 26a and 26b, the energy difference is adjusted using the dependency of reflection factor and transmission factor on the incident angle of laser beam, as shown in FIG. 3. The precision of energy balance of two laser beams 26a and 26b after passing through two polarized beam splitters is enhanced in an inexpensive way without needing the other optical components such as an optical attenuator.

Also, the rotation axis is located at the position where the emergent position is unchanged even if the incident angle on the polarized beam splitter is changed. Even if the polarized beam splitter is rotated to adjust the energy balance, it is managed to minimize a change in the angle or position of succeeding optical path.

For example, in the case where the rotation axis is arranged at a point of intersection between the window 32 and the mirror 33 in FIG. 2, when the polarized beam splitter is rotated by ±5°, the incident angle of laser beam on the window 32 is increased, but the incident angle on the mirror 33 is decreased. Or the incident angle of laser beam on the window 32 is decreased, but the incident angle on the mirror 33 is increased. The emergent angle of the laser beam being incident on the polarized beam splitter is 90° without error by offsetting an angle error, and there is no variation in the emergent position. Thereby, this effect is similarly provided, whether the window 32 or the mirror 33 for the polarized beam splitter is on the incident side.

Owing to the relationship between the reflection and transmission factors and the incident angle in the polarized beam splitter as shown in FIG. 3 and the above effect, when the energy of laser beam 26a reflected from the first polarized beam splitter 25 is high, the energy is decreased by rotating the second polarized beam splitter 27, and adjusting the transmission factor of laser beam 26a. Also, when the energy of laser beam 26b transmitted through the first polarized beam splitter 25 is high, the energy is decreased by rotating the first polarized beam splitter 25, and adjusting the transmission factor of laser beam 26b. Thereby, the later adjustment for the optical path is unnecessary, and the maintenance time is shortened.

Figure 4:
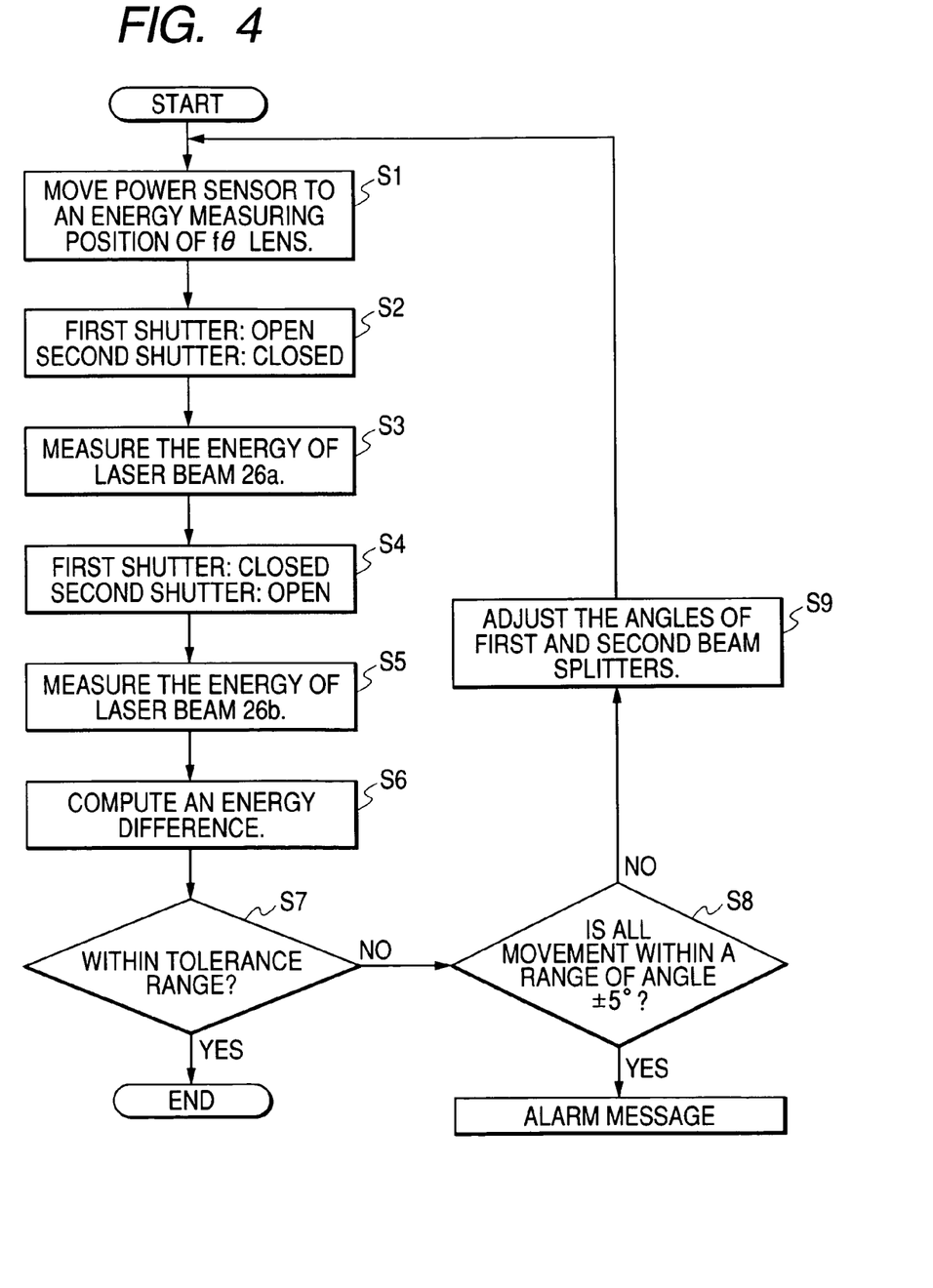
FIG. 4 is a flowchart of a program for automatically correcting the deflection angle of a galvano scanner.

Referring to FIG. 4, a flow for automatically adjusting the angle of the polarized beam splitter to control the energy balance of laser beams will be described below.

First of all, the power sensor 35 is moved to the position where a light receiving portion of the power sensor 35 fixed on the XY stage 31 can receive laser beam emergent from the fθ lens 28 (step S1).

Thereafter, the first shutter 34a is opened, and the second shutter 34b is closed (step S2). Then, a laser light is emitted from the laser oscillator, not shown, and an energy of the laser beam 26a is measured by the power sensor 35 (step S3).

After measuring the energy, the oscillation of laser light is once stopped, the first shutter 34a is closed, and the second shutter 34b is opened (step S4).

By emitting laser light again, an energy of laser beam 26b is measured by the power sensor 35 (step S5).

An energy difference between two laser beams 26a and 26b measured by a control device is calculated (step S6). If it is within a tolerance value, the adjustment is ended. However, if it is out of the tolerance value, the first polarized beam splitter 25 and the second polarized beam splitter 27 are rotated to adjust the transmission factor of each polarized beam splitter (step S9), whereby the adjustment is repeated by measuring the energies of two laser beams again until it is within the tolerance value.

Also, it is determined whether or not the tolerance value of energy difference is within a preset range of rotation angle for the polarized beam splitter, for example, within a range of ±5° (step S8). If it is not within the preset range, the circular polarization factor is reduced when the laser light of circular polarization is conducted from the laser oscillator, or when the laser light of linear polarization is conducted, it is judged that the apparatus is in a condition requiring the maintenance for the angle deviation in the polarization direction in which laser beam is conducted at an angle of 45° with respect to the polarization direction of transmission or reflection in the first polarized beam splitter 25, whereby the program is ended, and a message indicating that the program is abnormally ended and prompting the maintenance is displayed on the operation screen, not shown.

This automatic adjustment for the angle of the polarized beam splitter is made periodically, for example, at the time of setup or starting the apparatus. Thereby, the energy balance of laser beams is always maintained at high precision, and the worker does not need the skills, thereby performing the stable machining.

Figure 5:
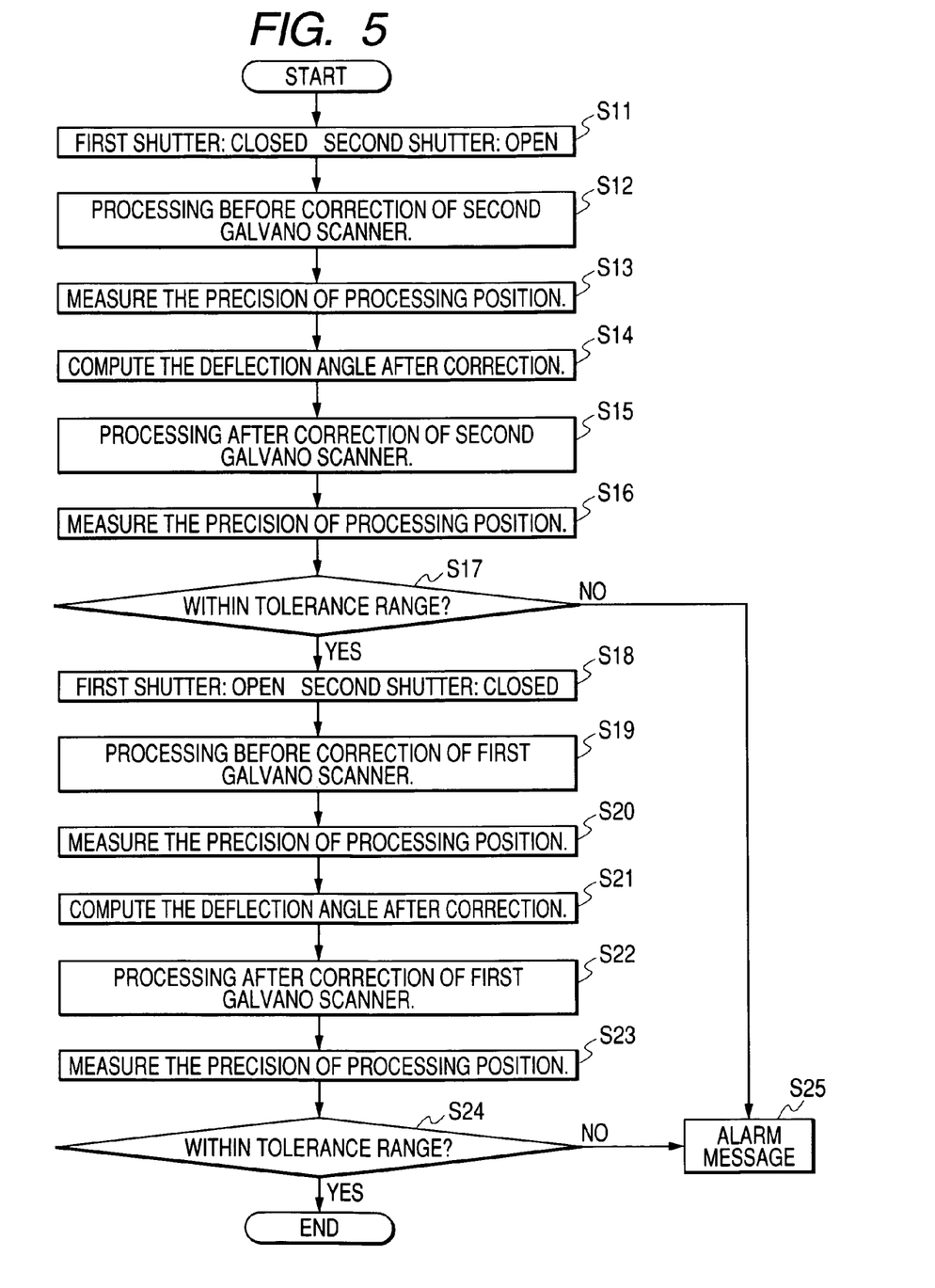
FIG. 5 is a flowchart of a program for automatically adjusting the angle of the polarized beam splitter.

Referring to FIG. 5, a flow for making the automatic correction for the deflection angle of the galvano scanner to maintain or improve the precision of processing position is shown.

First of all, the workpiece 37 (e.g., acrylic plate) for correction that is placed beforehand on the XY stage 31 is moved to the processing area of the fθ lens 28. The second shutter 34b is opened, and the first shutter 34a is closed (step S11). The laser beam 26b is caused to scan by the second galvano scanner 30, the machining before correcting the deflection angle of the second galvano scanner 30 is made within a preset range, for example, within a range of 50 mm square of the workpiece (step S12).

After making the machining, the positional precision of processed hole is measured with the CCD camera 36 by driving the XY stage 31 (step S13).

By comparing the measurement result with the reference position, the correction value for the deflection angle of the second galvano scanner 30 is calculated in the control device, not shown (step S14).

Thereafter, the XY stage 31 is driven to move the workpiece 37 for correction within the processing area of the fθ lens 28, whereby the workpiece 37 is machined after correcting the deflection angle of the second galvano scanner 30 (step S15).

After making the machining, the positional precision of processed hole is measured with the CCD camera 36 by driving the XY stage 31 (step S16), and compared with the preset tolerance value (step S17). When it is out of the tolerance value, the program is ended to inform the operator that the apparatus has the abnormality or there is an error in usage of the method, and a message with the contents indicating that the program is abnormally ended is displayed on the operation screen, not shown.

On the other hand, within the tolerance value, the correction for the deflection angle of the second galvano scanner 30 is ended, and the correction for the deflection angle of the first galvano scanner 29 is made.

In correcting the deflection angle of the first galvano scanner 29, the first shutter 34a is opened, and the second shutter 34b is closed (step S18). Thereby, the laser beam 26a alone is caused to scan by the first galvano scanner 29 and the second galvano scanner 30, in which the machining before correcting the deflection angle of the first galvano scanner 29 is made in the same range as at the time of correcting the deflection angle of the second galvano scanner 30 (step S19).

For example, the first galvano scanner 29 controls the laser beam 26a to scan in a range of 4 mm square around the laser beam 26b, and the second galvano scanner 30 controls the laser beam 26a to scan in a range of 46 mm square around the laser beam 26a, whereby the laser beam 26a passed via the first and second galvano scanners 29 and 30 makes the machining in a range of 50 mm square.

After making the machining, the positional precision of processed hole is measured with the CCD camera 36 by driving the XY stage 31 (step S20)

By comparing the measurement result with the reference position, the correction value for the deflection angle of the first galvano scanner 29 is calculated in the control device (step S21).

Thereafter, the XY stage 31 is driven to move the workpiece 37 for correction within the processing area of the fθ lens 28, whereby the workpiece 37 is machined after correcting the deflection angle of the first galvano scanner 29 (step S22).

After making the machining, the positional precision of processed hole is measured with the CCD camera 36 by driving the XY stage 31. When it is out of the tolerance value, the program is ended to inform the operator that the apparatus has an abnormality of the apparatus or there is an error in usage of the method in the same manner as correcting the deflection angle of the second galvano scanner 30 and a message with the contents indicating that the program is abnormally ended is displayed on the operation screen, not shown.

On the other hand, within the tolerance value, the correction for the deflection angle of the first galvano scanner 29 is ended.

The automatic correction for the deflection angle of the galvano scanner is performed, if any conditions are satisfied, for example, if the temperature of the galvano scanner main body or the peripheral temperature is monitored to detect a temperature change, or when a fixed time has passed. Thereby, the machining is always performed at stable positional precision.

In this embodiment, means for conducting the laser light of circular polarization to the polarized beam splitter and separating the laser light into beams is employed. However, though not shown in the embodiment, the linearly polarized light may be oscillated from the laser oscillator and conducted at an angle of 45° with respect to the polarization directions of reflection and transmission that are orthogonal to each other in the polarized beam splitter, whereby the same effects are obtained.

Embodiment 2

After separation into laser beams by the polarized beam splitter, the laser beams are circularly polarized again, or incident on the polarized beam splitter at an angle of 45° with respect to the polarization directions of reflection and transmission, whereby the separation into laser beams is repeated, and the machining is made using not only two beams but also 2n laser beams.

Figure 6:
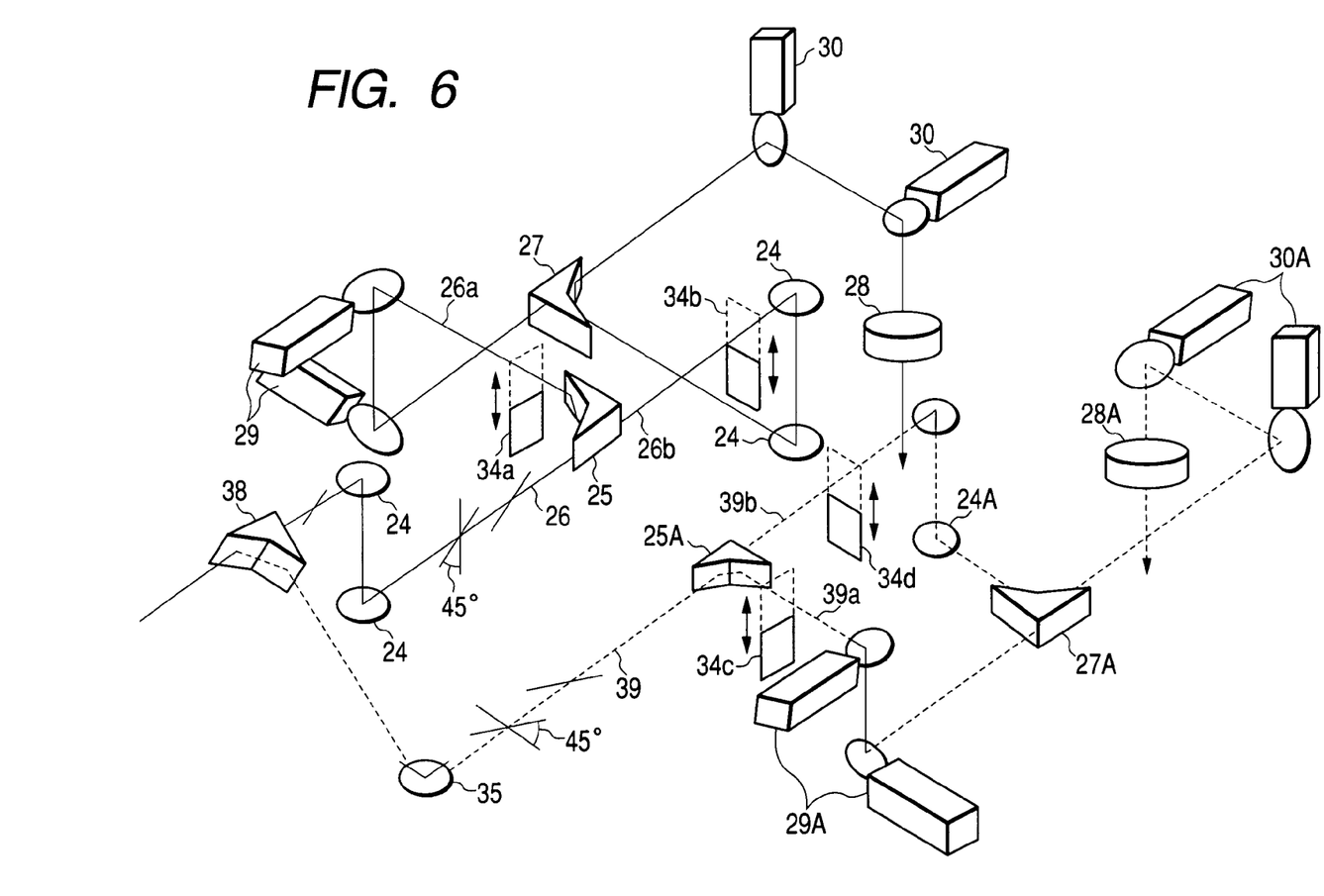
FIG. 6 is a view showing the schematic constitution of an example of the laser material processing apparatus when four laser beams are employed to perform the processing by adding polarizing means.

FIG. 6 is a schematic constitutional view showing an example of the laser material processing apparatus in which third polarizing means is added to make the machining using four laser beams.

In the constitution as shown in FIG. 6, a laser light of circular polarization or linear polarization is oscillated and conducted from the laser oscillator, not shown, and separated into laser beams by a third polarized beam splitter 38. The optical path is constituted so that the polarization direction of a laser beam 26 transmitted through the third polarized beam splitter 38 and the polarization direction of a reflected laser beam 39 make an angle of 45° with respect to the polarization directions of reflection and transmission in the first polarized beam splitters 25 and 25A. Thereby, the laser beam 26 is separated into the laser beams 26a and 26b and the laser beam 39 is separated into the laser beams 39a and 39b.

The optical path following the first polarized beam splitters 25 and 25A has the same constitution as in the embodiment of the invention as shown in FIG. 1, whereby the machining is made by applying four laser beams on the workpiece.

The optical path lengths from the third polarized beam splitter 38 for separation to the workpiece subject to the laser beams are made equal, and the beam spot diameters of four separated laser beams are made equal.

Figure 7:
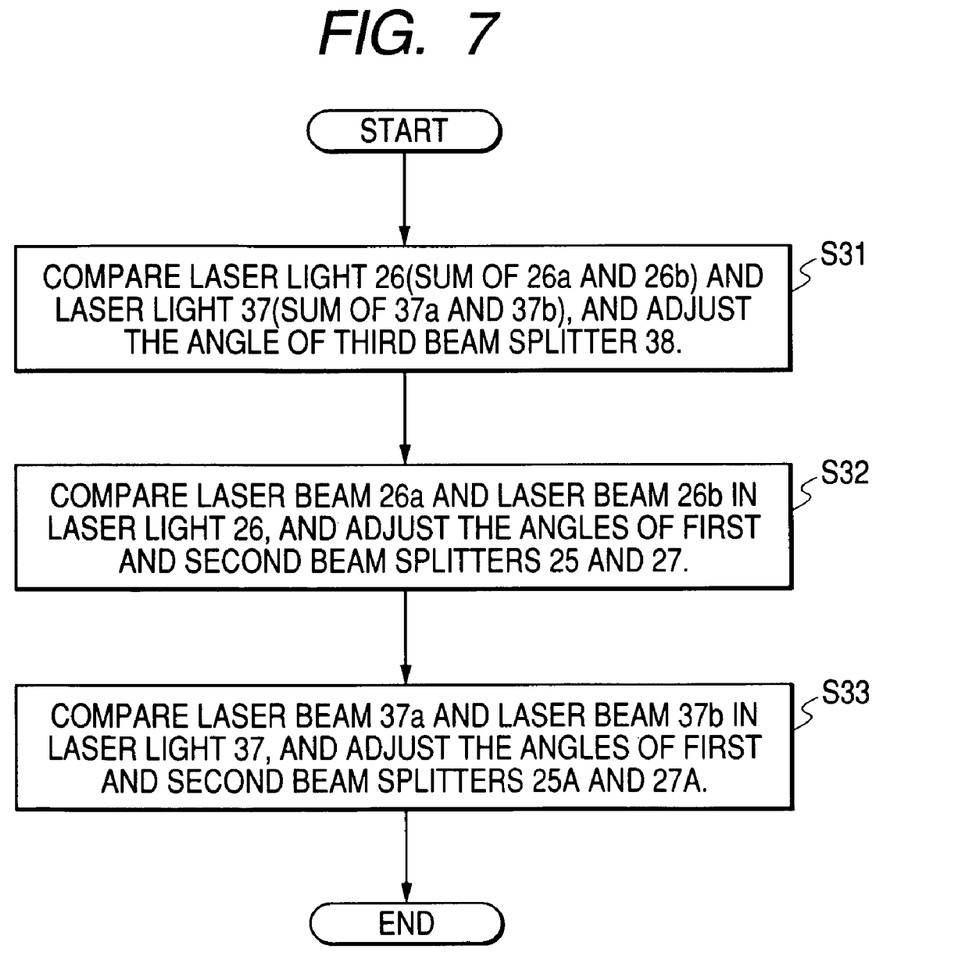
FIG. 7 is a flowchart of a program for automatically correcting the deflection angle of the galvano scanner.

To adjust the beam splitter, by comparing the energy of laser beam 26 (sum of laser beams 26a and 26b) when the first and second shutters 34a and 34b are only opened, and the energy of laser beam 39 (sum of laser beams 39a and 39b) when the third and fourth shutters 34c and 34d are only opened, the third polarized beam splitter 38 is rotated to change the incident angle of laser light, so that the laser beam 26 transmitted through the polarized beam splitter 38 and the energy of reflected laser beam 39 may be equal, as shown in FIG. 7.

Thereafter, by comparing the energy of laser beam 26a when the first shutter 34a alone is opened and the energy of laser beam 26b when the second shutter 34b alone is opened, the first polarized beam splitter 25 and the second polarized beam splitter 27 are rotated and adjusted so that the energy of laser beam 26 is equally divided into the laser beams 26a and 26b (step S32).

Finally, by comparing the energy of laser beam 39a when the third shutter 34c alone is opened, and the energy of laser beam 39b when the fourth shutter 34d along is opened, the first polarized beam splitter 25A and the second polarized beam splitter 27A are rotated, and adjusted so that the energy of laser beam 39 is equally divided into the laser beams 39a and 39b (step S33).

With the above adjustments, the energy balance of four laser beams conducted to the workpiece 34 is enhanced.

For the automatic correction for the deflection angle of the galvano scanner, the deflection angle of each galvano scanner is corrected by detecting a deviation from the reference position with the laser beams 26a, 26b, 39a and 39b in a state where any one of the shutters 34 is opened.

As described above, if the laser material processing apparatus according to this invention is employed, a difference in the quality or energy between separated laser beams is equalized to improve the productivity. Also, by making the optical path length of two separated laser beams equal, the beam spot diameters of two laser beams are made equal. Also, a rotating mechanism is provided in the stationary portion of polarizing means, whereby there is the effect that the variation in the energy of two laser beams separated is minimized less expensively.

INDUSTRIAL APPLICABILITY

As described above, the laser material processing apparatus according to the invention is suitable for drilling the workpiece such as the printed board.

The invention claimed is:

1. A laser material processing apparatus for processing a workpiece in such a way as to separate one laser light beam into two laser light beams, comprising:
   a first polarizing means;
   a second polarizing means;
   a first galvano scanner;

a second galvano scanner; and
a plurality of mirrors,
wherein the first polarizing means, the second polarizing means, the first galvano scanner, the second galvano scanner, and the plurality of mirrors are arranged so that:
a first laser beam transmitted through said first polarizing means is reflected by said second polarizing means, and is conducted to said second galvano scanner;
a second laser beam reflected by said first polarizing means is conducted to both of said first galvano scanner and said second polarizing means, and
said second laser beam reflected by said first polarizing means is transmitted through said second polarizing means, and is conducted to said second galvano scanner,
wherein the deflection angle by which said first galvano scanner scans is smaller than the deflection angle by which said second galvano scanner scans.

2. A laser material processing apparatus for processing a workpiece in such a way as to separate one laser light beam into two laser light beams, comprising:
a first polarizing means;
a second polarizing means;
a first galvano scanner;
a second galvano scanner; and
a plurality of mirrors,
wherein the first polarizing means, the second polarizing means, the first galvano scanner, the second galvano scanner, and the plurality of mirrors are arranged so that:
a first laser beam transmitted through said first polarizing means is reflected by said second polarizing means, and is conducted to said second galvano scanner;
a second laser beam reflected by said first polarizing means is conducted to both of said first galvano scanner and said second polarizing means, and
said second laser beam reflected by said first polarizing means is transmitted through said second polarizing means, and is conducted to said second galvano scanner,
wherein each of the first and second laser beams is reflected by the same number of mirrors on each optical path formed between said first polarizing means and said second polarizing means.

3. A laser material processing apparatus for processing a workpiece in such a way as to separate one laser light beam into two laser light beams, comprising:
a first polarizing means;
a second polarizing means;
a first galvano scanner;
a second galvano scanner; and
a plurality of mirrors,
wherein the first polarizing means, the second polarizing means, the first galvano scanner the second galvano scanner and the plurality of mirrors are arranged so that:
a first laser beam transmitted through said first polarizing means is reflected by said second polarizing means, and is conducted to said second galvano scanner;
a second laser beam reflected by said first polarizing means is conducted to both of said first galvano scanner and said second polarizing means, and said second laser beam reflected by said first polarizing means is transmitted through said second polarizing means, and is conducted to said second galvano scanner,
wherein a stationary portion of at least one of the first and second polarizing means is provided with a rotating mechanism around an axis perpendicular to a surface containing the axes of two separated laser beams.

4. The laser material processing apparatus according to claim 3, characterized in that an energy balance of said first and second laser beams is adjusted by changing a transmission factor of the laser beam transmitted through one of the first and second polarizing means by rotation of said rotating mechanism provided on said at least one of the first and second polarizing means.

5. A laser material processing apparatus for processing a workpiece in such a way as to separate one laser light beam into two laser light beams, comprising:
a first polarizing means;
a second polarizing means;
a first galvano scanner;
a second galvano scanner; and
a plurality of mirrors,
wherein the first polarizing means, the second polarizing means, the first galvano scanner, the second galvano scanner, and the plurality of mirrors are arranged so that:
a first laser beam transmitted through said first polarizing means is reflected by said second polarizing means, and is conducted to said second galvano scanner;
a second laser beam reflected by said first polarizing means is conducted to both of said first galvano scanner and said second polarizing means, and
said second laser beam reflected by said first polarizing means is transmitted through said second polarizing means, and is conducted to said second galvano scanner, and
further comprising a laser beam selecting means for selecting any laser beam from among the first and second laser beams.

6. The laser material processing apparatus according to claim 5, characterized in that said laser beam selecting means controls a shutter provided on an optical path of each of the first and second laser beams to be opened or closed to take out the respective one of the first and second laser beams from that optical path.

7. The laser material processing apparatus according to claim 5 or 6, characterized by further comprising detection means for detecting an energy balance of the first and second laser beams on each optical path, so that the energy balance of each laser beam detected by said detection means can be adjusted to be almost equivalent.

8. The laser material processing apparatus according to claim 7, characterized in that said detection means consists of a power sensor provided near an XY table on which the workpiece is laid.

* * * * *